United States Patent [19]

DePompei et al.

[11] Patent Number: 5,077,360
[45] Date of Patent: Dec. 31, 1991

[54] ACRYLIC SEALANT COMPOSITION AND METHODS RELATING THERETO

[75] Inventors: Michael F. DePompei, Broadview Hts.; Pamela K. Hernandez, Brunswick, both of Ohio

[73] Assignee: Tremco Inc., Beachwood, Ohio

[21] Appl. No.: 672,371

[22] Filed: Mar. 20, 1991

[51] Int. Cl.$^5$ .................. C08F 2/00; C08F 220/10; C08G 18/00; C08G 63/91
[52] U.S. Cl. .................. 526/217; 525/452; 525/418; 525/330.5; 528/61
[58] Field of Search .................. 526/217

[56] References Cited

U.S. PATENT DOCUMENTS 4,507,443  3/1985  Barron et al. .................. 525/453

Primary Examiner—Joseph L. Schofer
Assistant Examiner—Wu C. Cheng
Attorney, Agent, or Firm—Mary Ann Tucker; Konrad H. Kaeding

[57] ABSTRACT

The present invention is directed to a one part, sealant composition preferably comprising a free isocyanate functionalized polyacrylate. The unblocked isocyanate is surprisingly stable even in the presence of a blocked amine curing agent. Upon exposure to ambient conditions, the blocked amine will react with ambient humidity to provide an amine which in turn will react with the polyacrylate isocyanate, thereby curing the sealant and providing exceptional sealant properties. The most preferred blocked amine curative is a ketimine.

10 Claims, No Drawings

ACRYLIC SEALANT COMPOSITION AND METHODS RELATING THERETO

FIELD OF THE INVENTION

The present invention is directed to a sealant composition which cures, preferably by means of ambient humidity, to a material comprising acrylic or acrylate segments which are linked and/or crosslinked by means of substituted amide, urea or urethane linkages. More specifically, the present invention is preferably a one part, non-latex acrylic sealant having unblocked isocyanate functionality and a blocked amine curative, wherein the cured product provides excellent adhesion, even to glass, and provides superior performance over typical acrylic sealant compositions.

BACKGROUND OF THE INVENTION

Acrylic Sealants

Conventional acrylic sealants are typically water-based (latex) compositions used in the low cost, low performance residential construction and home repair markets. Such sealants typically have poor flexibility and generally shrink due to water evaporation.

Latex acrylic emulsion sealants are generally based upon acrylic or methacrylic acid, their esters (typically methyl esters) or variations thereof. These prepolymer components are generally emulsified with other monomers, such as vinyl chloride. The emulsified prepolymer charge is then typically polymerized by free radical initiation, whereby the emulsion is maintained during and after polymerization. A wide variety of acrylic emulsions can be prepared by varying the type and blends of prepolymer components. The acrylic polymer emulsion is then formulated with other ingredients to produce the sealant. Such other ingredients typically include plasticizers which enhance flexibility, antifreeze additives to prevent freezing, and biocidal preservatives to prevent bacterial attack of the acrylic polymer.

Isocyanate Monomers Having Aliphatic Unsaturation

Isocyanate monomers comprising aliphatic unsaturation are known in the art. One such monomer is m-isopropenyl-alpha, alphadimethyl benzyl isocyanate ("m-TMI"). The m-TMI monomer comprises a vinyl polymerizable group and an isocyanate polymerizable group. Either reactive site can be reacted independently, leaving the other functional group unaffected and available for subsequent modifications.

Isocyanate monomers having aliphatic unsaturation have conventionally been used in coating resins and adhesives. The isocyanate polymerizable group is typically left in tact until the composition is applied to a substrate. Thereafter the isocyanate will react with a curing agent which crosslinks the material, thereby typically enhancing adhesion and making the material substantially rigid. Such coatings and adhesives have generally either involved—(1) blocked isocyanate, one part systems; or (2) unblocked isocyanate, two part systems.

Contrary to previous known systems, the present invention is directed to an unblocked isocyanate, one part, non-latex acrylic sealant having excellent shelf stability and surprisingly advantageous sealant properties.

OBJECTS OF THE PRESENT INVENTION

It is an object of the present invention to provide a high solids, sealant composition comprising a polyacrylate backbone having free (unblocked) isocyanate functionality, whereby the composition cures by means of the isocyanate reaction to provide a non-rigid composition which is surprisingly flexible, while exhibiting excellent adhesion, even to glass.

Other objects and features of the present invention will become obvious to those of ordinary skill in the art upon further reading of this specification and accompanying claims.

SUMMARY OF THE INVENTION

The present invention is preferably directed to a one part, sealant composition comprising a free isocyanate functionalized polyacrylate. The isocyanate is preferably unblocked and is surprisingly stable even in the presence of a blocked amine curing agent. Upon exposure to ambient conditions, the blocked amine will react with ambient humidity to provide an amine which in turn will react with the polyacrylate isocyanate, thereby curing the sealant and providing exceptional sealant properties. The most preferred blocked amine curative is a ketimine.

The sealant prepolymers of the present invention are preferably the reaction product of a monomer charge comprising a first class of monomers and a second class of monomers. The first class of monomers preferably comprise acrylate, methacrylate and derivatives thereof, particularly ethyl and butyl acrylate. The second class of monomers preferably comprise a free radical polymerizable, unsaturated aliphatic, mono isocyanate, most preferably m-TMI (isopropenyl-α,α-dimethylbenzyl-isocyanate). The weight ratio of the first class of monomers to the second class of monomers is preferably between about 100:0.01 and about 100:5, more preferably about 100:0.1 to about 100:3 and most preferably about 100:2.

The prepolymer can be free radical polymerized using conventional techniques and can then be combined with conventional sealant fillers and additives. The acrylic sealants of the present invention provide superior performance over typical acrylic sealant compositions and are capable of obtaining ASTM Class A C-920 performance for plus or minus 25 percent movement.

DETAILED DESCRIPTION OF THE PREFERRED EMBODIMENT

The preferred sealant composition of the present invention comprises a prepolymer which is preferably the free radical polymerization product of a reagent charge comprising a first class of monomers having vinyl functionality and a class of monomers having vinyl and isocyanate functionality. The polymerization is preferably a single charge, single polymerization process, but it would be possible to conduct the polymerization in more than one step and/or using more than one reagent charge.

First Class Of Monomers—Preferred Monomers: Acrylates

The first class of monomers includes any conventionally known, free radical polymerizable vinyl monomers. The more preferred vinyl monomers are acrylic acids and ester monomers, and the most preferred vinyl monomers are acrylic esters. The most preferred acrylate monomers of the present invention have the formula:

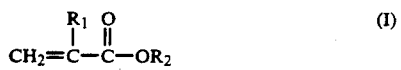

wherein $R_1$ is hydrogen, or an alkyl having from 1 to 3 carbon atoms with hydrogen or methyl being preferred. $R_2$ can be an alkyl or an ether having from 1 to about 50 carbon atoms. Desirably $R_2$ is an alkyl having from 1 to 18 carbon atoms and preferably an alkyl having from 2 to 4 carbon atoms. Particularly preferred monomers of the first class of monomers include methyl, ethyl, propyl or butyl acrylate esters and derivatives thereof.

Examples of other specific acrylate monomers useful in the present invention include: hexyl acrylate, octyl acrylate, 2-ethylhexyl acrylate, nonyl acrylate, decyl acrylate, phenyl acrylate, nonylphenyl acrylate, ethyl methacrylate, butyl methacrylate, hexyl methacrylate, 2-ethyl-hexyl methacrylate, lauryl methacrylate and the like. When $R_2$ is an ether, it is to be understood that it can be a monoether, a diether, or a multiple ether of an alkyl, an aryl or combinations thereof such as alkoxyalkyl, phenoxyaryl, and the like, with alkoxyalkyl being preferred. Examples of specific alkoxyalkyl acrylates include methoxymethyl acrylate, butoxyethyl acrylate, ethoxypropyl acrylate, methoxyethyl acrylate, ethoxyethyl acrylate, and the like. Examples of specific phenoxyalkyl acrylates include 2-phenoxyethyl acrylate, and 2-phenoxyalkyl methacrylate.

When more than one Formula I acrylic-type monomer is utilized, the comonomer often is selected to yield a copolymer having a suitable or desired glass transition temperature or other specific property. Ordinary skill and experimentation may be necessary, depending upon the specific end-use requirements for any particular embodiment of the present invention. In the preferred embodiment, a somewhat stiff ethyl acrylate is preferably used together with a relatively softer butyl acrylate, preferably in a weight ratio of about 80:20 to about 20:80, more preferably about 50:50.

Second Class of Monomers—Monomer: m-TMI

Regarding the second class of monomers, the preferred monomers are free radical polymerizable, unsaturated aliphatic, mono isocyanate. Such monomers can be synthesized by the addition reaction of isocyanic acid to olefins to obtain the corresponding isocyanate having aliphatic unsaturation. This reaction is particularly useful in preparing isocyanates from vinyl aromatics. The reaction proceeds readily with addition of the isocyanate moiety to the more highly substituted carbon atom of the olefin.

A particularly useful synthesis of an unsaturated aliphatic, mono isocyanate is described in U.S. Pat. No. 4,377,530 to Trenbeath et al., hereby incorporated by reference. Trenbeath discloses a method of synthesizing isopropenyl-α,α-dimethylbenzylisocyanate ("m-TMI"). This monomer is particularly advantageous, because it can be easily polymerized with acrylate prepolymers via the m-TMI double bond, without reacting the isocyanate group.

The weight ratio of second class of monomers to first class of monomers is preferably from about 0.01:100 to about 5:100, more preferably 0.1:100 to about 3:100, and most preferably about 2:100.

The Acrylate-m-TMI Polymer

The reaction product of the above described first and second reaction components preferably provides a prepolymer comprising an acrylate backbone having free isocyanate functionality pendant thereto. The copolymers of the present invention can be polymerized from the above-noted monomers in any conventional manner such as solution or precipitation polymerization.

Polymerization is typically initiated utilizing a free radical indicator such as an alkyl, aryl, alkaryl, or an aralkyl peroxide, a hydroperoxide, an azo compound, a peroxy ester, a percarbonate, or any other suitable free radical-type initiator, with azo compounds being preferred, particularly 1,1-azo-bis-cyclohexane carbonitrile. Examples of other specific initiators include benzoyl peroxide, lauroyl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, t-butyl peroxypivalate, di-t-butyl perphthalate, isopropyl percarbonate, acetyl cyclohexane sulfonyl peroxide, disecondary butyl peroxydicarbonate, t-butyl peroxyneodecanoate, ditertiarybutyl peroxide, dinormal propyl peroxydicarbonate, azo-bisisobutyronitrile, alpha, alpha'-azodiisobutyrate, 2,2'-azo-bis-(2,4-dimethyl valeronitrile), and the like. Polymerization can be carried out at suitable temperatures, desirably from about 50° to about 170° C., and preferably from about 100° to about 150° C.

The amount of the initiator utilized is generally quite small as from about 0.01 parts by weight to about 5.0 parts by weight and preferably from about 0.3 to about 3.0 parts by weight for every 100 parts by weight of the total monomers being copolymerized. The molecular weight of the copolymer can vary greatly. The acrylate prepolymer preferably has a weight average molecular weight of from about 10,000 to about 100,000.

Curing Agents

Preferred blocked amine curing agents include various ketimines or aldimines which are known to the art and to the literature. Such compounds are generally prepared by reacting a polyamine with either a ketone or an aldehyde. Examples of specific ketimine compounds which can be utilized are set forth in U.S. Pat. No. 4,507,443, which is hereby fully incorporated by reference.

An example of a typical polyamine, which is subsequently reacted with a ketone or an aldehyde, is a diamine or a triamine represented by the formula

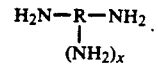

wherein R is an aliphatic, or an aliphatic substituted aromatic, with the aliphatic group being connected to the amine group having from 1 to 25 carbon atoms and preferably from 2 to 10 carbon atoms, with x being 0 or 1, and preferably 0. Examples of specific amine compounds include ethylene diamine, propylene diamine, butylene diamine, octamethylene diamine, decamethylene diamine, and the like.

Another class of suitable polyamine compounds are the various amine terminated polyethers. These compounds are generally diamines or triamines containing polyether groups therein wherein the number of repeating units can vary as from about 2 or 3 up to about 150. The molecular weight of the amine terminated polyethers is generally from about 200 to about 7,000.

Such compounds are produced by the Texaco Chemical Co. under the brand name Jeffamine such as the M series, the D series, the ED series, the DU series, the BuD series, and the Jeffamine T series. Such amine terminated polyethers are described in the bulletin, "The Jeffamine Polyoxylkyleneamines", by the Texaco Chemical Co., Copyrights 1985, NPD-024 102-0745, which is hereby fully incorporated by reference.

A particularly preferred compound is the Jeffamine D compounds which have the following formula:

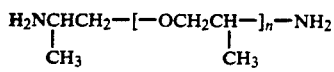

wherein n is from 2 to about 100 and preferably from about 4 to about 20.

Still another class of suitable polyamine compounds are the polyamines made from polyamines and dicarboxylic acids having from 2 to 36 carbon atoms such as oxalic acid, malonic acid, siccinic acid, adipic acid, suberic acid, azelaic acid, dimerized fatty acids, trimerized fatty acids, and the like.

As noted, the above types of polyamine compounds are reacted with either a ketone to yield a ketimine, or with an aldehyde to yield an aldimine which function as suitable crosslinking or curing agents of the present invention. The ketimine curing agents are more preferred. The amount of the crosslinking or curing agent is generally from about 0.10 to about 1.80 (weight equivalents) and preferably from about 0.9 to about 1.1 weight equivalent for every weight equivalent of said isocyanate.

The Final Sealant Product

The on-part sealant compositions of the present invention generally contain the acrylate/m-TMI copolymer, the ketimine or aldimine crosslinking or curing agents and, if desired, various standard additives in conventional amounts known to the art and to the literature such as various plasticizers, pigments, thickeners, drying agents, fillers, thixotroic agents, extenders, UV absorbers, solvents, drying agents, and the like.

Typically, sealant compositions of the present invention contain high amounts of filler such as approximately 45 percent to about 65 percent by weight based upon the total weight of the composition. The thickening agent such as thixotropic compound can be utilized in an amount of from about 0 to about 30 parts by weight per 100 parts by weight of the prepolymer. UV absorbers can be utilized in an amount of usually less than 1 or 2 parts by weight per 100 parts by weight of the prepolymer, and plasticizers can be utilized in an amount of from about 0 to about 50 parts by weight per 100 parts by weight of the prepolymer. Solvents can be utilized to adjust the viscosity of the composition and generally constitute less than 10 percent by weight of the composition.

The various components can generally be blended in any conventional manner as by adding them together and mixing the same to obtain a good distribution of the ingredients or components. The compositions of the present invention can be stored in various suitable airtight, moisture-resistant containers such as cartridges, cans, drums, and the like. However, upon the application to a substrate as a sealant, the ketimine or aldimine crosslinking agent reacts with moisture in the air to generate a polyfunctional primary amine which in turn readily reacts with the isocyanate contained within the copolymer and thus crosslinks the same. Curing occurs at ambient temperature, that is at temperatures of from about 0° to about 50° C. and preferably from about 15° C. to about 40° C.

The one part stability of the present invention is quite remarkable, because the m-TMI isocyanate is unblocked but does not react with the blocked amine, until the blocked amine is unblocked by ambient humidity. Such an unblocked isocyanate, one part sealant chemistry is unexpected.

The acrylate copolymer sealants and coatings of the present invention have been found to have a variety of favorable properties including good Shore A hardness, for example from about 20 to about 50, good tear strength of from about 20 to about 80 pli, good tack-free time of from about 6 to about 12 hours, good tensile strength of from about 5 to about 100 psi, and the like. The compositions of the present invention have also been found to readily meet ASTM Class A C-920 Spec for plus or minus 25 percent movement. It is quite unexpected that an acrylic-type sealant or coating could pass such a rigorous test. Moreover, the sealants and coating compositions of the present invention have improved weathering properties as compared to urethane sealants or coatings.

As sealants, the compositions of the present inventions can be utilized in a variety of applications including sealing windows, stone, and masonry; and building joints, such as between wood, concrete, masonry, aluminum, and the like. As coatings, they can be utilized on a variety of substrates such as wood, metal, masonry, concrete, and the like.

The present invention will be better understood by reference to the following examples.

POLYMERS

A 1 liter, 4 neck round bottom flask was equipped with a Dean-Stark trap, water cooled condenser, Claisen adapter, thermometer, pressure equalizing addition funnel, stir shaft with Teflon blade and nitrogen inlet/outlet. To the flask, 70 grams toluene was precharged to the flask and heated to reflux with mechanical agitation under nitrogen atmosphere. Upon reflux, the reagent charge was added dropwise through the addition funnel over a 2.5 to 3 hour period to the toluene. The reagent charge contained 2.13 grams (0.009 moles) dodecyl mercaptan (chain transfer agent), 6.4 grams Vazo 88 (1,1'-azobiscyclohexane carbonitrile) free radical initiator and also acrylate/m-TMI monomer as indicated in Table I. During monomer addition the temperature steadily increased and was held at 125° C. until monomer addition was complete. The temperature was then increased and maintained at 145° C. Scavenger catalyst containing 2.12 grams Lupersol 533M75 (ethyl 3,3 di-(tertiary amyl peroxy)butyrate) dissolved in 5 grams toluene was added dropwise via the addition funnel over an approximately 30 minute period. After scavenger addition was complete, the viscous polymer solution was heated at 145° C. for an additional 2 hours, then cooled and transferred to a storage container. The monomer charge for each experiment is provided in Table I.

TABLE I

| | Monomer Charge | | | | | | |
|---|---|---|---|---|---|---|---|
| | Ethyl Acrylate | | Butyl Acrylate | | m-TMI | | EtAc/ BuAc/m-TMI |
| Example | gms[1] | (moles) | gms[1] | (moles) | gms[1] | (moles) | weight ratio |
| 1 | 418.3 | (4.18) | — | | 8.5 | (0.042) | 100/0/2 |
| 2 | 334.6 | (3.34) | 83.3 | (0.66) | 8.5 | (0.042) | 80/20/2 |
| 3 | 208.3 | (2.08) | 208.3 | (1.64) | 8.5 | (0.042) | 50/50/2 |
| 4 | 83.7 | (0.84) | 416.6 | (3.28) | 8.5 | (0.042) | 20/80/2 |

[1]grams

Preparation of Sealant, General Procedure

To a one quart Waring blender, the following was charged: 150 grams of polymer, 25-60 grams of diisodecylphthalate, and 5 grams of dry Thixatrol ST thickener (dehydrogenated castor bean oil). The mixture was blended at high speed under a nitrogen blanket until the internal temperature reached 150° F. This required 5-7 minutes. The mixture was allowed to cool for 15-20 minutes, at which time 200 g dry calcium carbonate was added. The entire mixture was blended at a high speed for 5 minutes. The mixture was allowed to cool for 10-15 minutes, at which time the ketimine was added in stoichiometric amount based on the polymer. The material was then placed in tubes.

Sample Preparation for Mechanical Property Evaluation

Polymer sheets were prepared by mixing 75-100 g polymer resin with a stoichiometric amount of ketimine (equal to the equivalent weight of isocyanate). Polymer was poured and cured at room temperature and relative humidity for 21 days. Sealant sheets were spread to about 0.25 inch thicknesses and cured as above. The properties of the samples were tested and are summarized in Table II.

While in accordance with the Patent Statutes, the best mode and preferred embodiment has been set forth, the scope of the invention is not limited thereto, but rather by the scope of the attached claims.

TABLE II

| | MECHANICAL PROPERTIES OF SEALANT | | | | |
|---|---|---|---|---|---|
| Example | Composition of Polymer EA/BA/m-TMI[1] | Tensile (psi)[2] | % Elongation[3] | Peel Strength (pli)[4] | Shore A @ 14 Days[5] |
| 1 | 100/0/2 | 97 | 200 | 9.8(c) | 25 |
| 2 | 80/20/2 | 81 | 390 | 7.0(c) | 15 |
| 3 | 50/50/2 | 66 | 430 | 5.5(c) | 12 |
| 4 | 10/90/2 | 57 | 370 | 2.5(c) | 12 |

[1]EA = ethyl acrylate; BA = butyl acrylate; m-TMI = isopropenyl-α,α-dimethylbenzylisocyanate
[2]pounds force per square inch using ASTM D412
[3]ASTM D412
[4]pounds per linear inch before cohesive failure using ASTM C794
[5]ASTM C-661

What is claimed is:

1. A sealant composition comprising:
   a prepolymer which is the reaction product of one or more monomer charges comprising a first monomer and a second monomer;
   the first monomer comprising an acrylate, methacrylate or derivatives thereof;
   the second monomer comprising a free radical polymerizable, unsaturated aliphatic, mono isocyanate;
   said prepolymer having isocyanate moieties capable of reacting with an amine, wherein the weight ratio of first monomer to second monomer is between about 100:0.01 and about 100:5; and
   said sealant composition further comprising a blocked amine curing agent.

2. The sealant composition of claim 1 further defined as meeting ASTM Class A C-920 specification for plus or minus 25 percent movement.

3. The sealant composition of claim 1 wherein the prepolymer isocyanate moities are unblocked.

4. The sealant of claim 3 wherein the blocked amine is a ketimine.

5. The sealant of claim 4 wherein the second monomer is m-TMI.

6. The sealant of claim 5 wherein the weight ratio of the first monomer to second monomer is about 100:0.1 to about 100:3.

7. The sealant of claim 6 wherein the weight ratio of the first monomer to second monomer is about 100:2.

8. The sealant of claim 7 wherein the weight average molecular weight of the prepolymer is about 10,000 to about 100,000.

9. The sealant of claim 8 wherein the first monomer is ethyl acrylate and butyl acrylate in a weight ratio of from about 20:80 to about 80:20.

10. The sealant of claim 9 wherein the weight ratio of ethyl acrylate to butyl acrylate is about 50:50.

* * * * *